J. M. THOMPSON.
DRIVING GEAR FOR GRINDING MACHINES.
APPLICATION FILED DEC. 9, 1907.

940,089.

Patented Nov. 16, 1909.

Witnesses
George Felber
Ralph Nelson

Inventor:
James M. Thompson,
By Oliphant & Young,
Attorneys

UNITED STATES PATENT OFFICE.

JAMES M. THOMPSON, OF MILWAUKEE, WISCONSIN, ASSIGNOR TO LUTHER BROS. CO., OF MILWAUKEE, WISCONSIN.

DRIVING-GEAR FOR GRINDING-MACHINES.

940,089.  Specification of Letters Patent.  Patented Nov. 16, 1909.

Application filed December 9, 1907. Serial No. 405,713.

*To all whom it may concern:*

Be it known that I, JAMES M. THOMPSON, a citizen of the United States, and resident of Milwaukee, in the county of Milwaukee and State of Wisconsin, have invented certain new and useful Improvements in Driving-Gears for Grinding-Machines or the Like; and I do hereby declare that the following is a full, clear, and exact description thereof.

The object of my invention is to provide a simple and effective manual-power driving-mechanism for grinders or the like, the invention consisting in various details of construction and combination of mechanical elements as fully set forth hereinafter with reference to the accompanying drawings and subsequently claimed.

Figure 2:
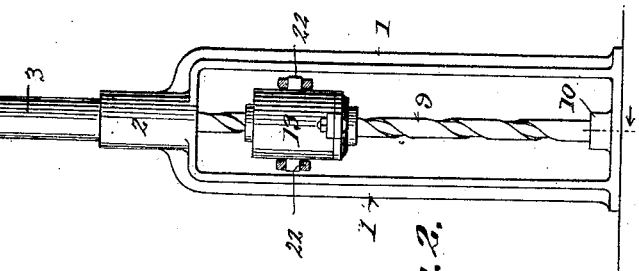
Figure 3:
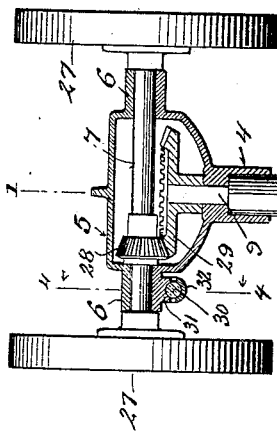
Figure 3:
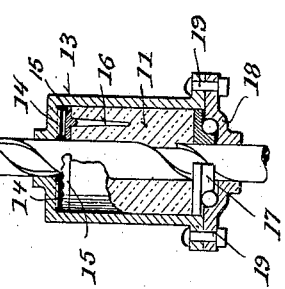
Figure 1:
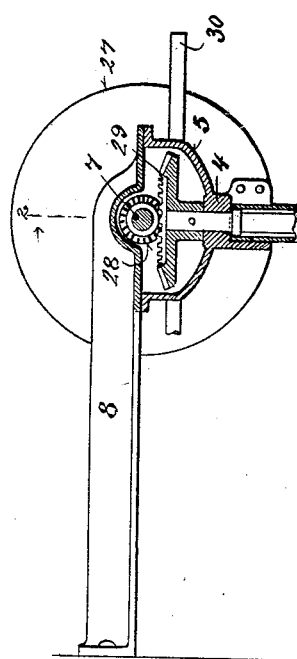
Figure 1:
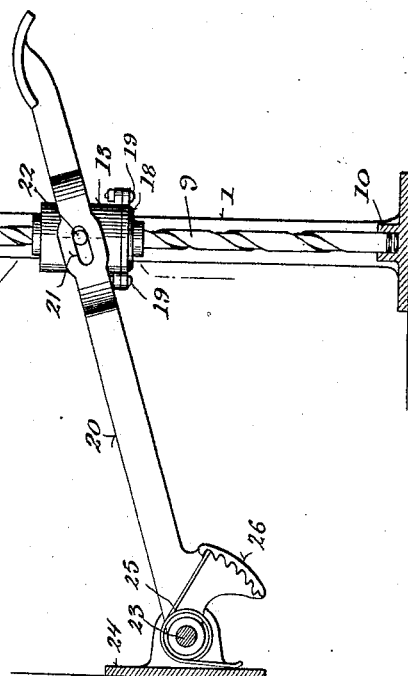

In the drawings: Figure 1 represents a side elevation of a grinder embodying the features of my invention with parts broken away and parts in section to better illustrate the details, the section being indicated by line 1—1 of Fig. 2; Fig. 2, a rear view of same partly in section, as indicated by line 2—2 of Fig. 1; Fig. 3, an enlarged detail sectional view of a nut and housing therefor employed to impart rotation to a vertical driving spindle, the spindle being shown in position therein with portions of the nut in full and broken away, and Fig. 4, a detail section on line 4—4 of Fig. 2, illustrating an adjustable tool-rest.

Referring by numerals to the drawings, 1 indicates a bifurcated standard, and fitted into a partially split sleeve 2 of which standard is a vertically disposed tube 3, having its upper end socketed into a shank 4 of one member of a gear-housing 5. This housing is composed of two parts, having semicircular boxes 6 bolted together to form bearings for a shaft 7, there being a leg 8 extending from the upper housing section for securing the same to any convenient support, while the standard may be secured to the floor, thus providing for rigidity of all parts of the grinder-frame. A spindle 9 having an upper bearing in the housing-shank 4 is incased within the tube and has an intermediate bearing in the sleeve 2 of the standard, the lower end of the spindle being stepped into a boss 10 of the standard base. This spindle, between said base and standard sleeve is threaded to receive a cylindrical rotatory nut 11, which nut is loosely fitted into a non-rotatable housing 13.

The nut is preferably composed of Babbitt-metal having a central aperture, which conforms to the pitch of the spindle thread, on which spindle it is arranged to either rotate or slide in locked engagement with the housing. With this in view the housing-head is provided with a series of serrations 14, adapted to be engaged by a corresponding serrated plate 19 of hardened metal, which plate is molded into the nut, being held in place by anchor-pins 16. The nut has sufficient longitudinal play in the housing, so that, by gravity, it will disengage itself from the serrations of said housing, when the latter is at rest or forced upward, there being a cone-disk 17 at the bottom of said nut, between which and a dished cap 18 a series of anti-friction balls are inserted. The cap 18 is secured to the housing by retaining bolts 19 that engage ears of said cap and housing. Thus when the housing is moved in an upward direction, the nut will be disengaged therefrom and revolve freely, the end-thrust being somewhat eliminated by the anti-friction balls, and when the direction of said housing is reversed, the serrated plate of said nut will immediately engage the serrations of the housing, causing a locking of the two members which will result in a rotation of the spindle.

The means employed for reciprocation of the housing to accomplish the above results in this instance is applied to said housing through a foot-lever 20, which is looped around the aforesaid housing and provided with slotted apertures 21 for engagement with pins 22, which pins project from the housing. The rear end of the foot-lever is fulcrumed upon a stud 23 between ears of a bracket 24, which bracket is secured to any convenient wall or post. A spiral-spring 25 surrounds the stud 24 having one end resting against the bracket and its opposite end fitted into any one of a series of notches which project from a sector 26 of the foot-lever. This end of the spring is so arranged to regulate the spring-tension that is required to lift said foot-lever upward, the reverse or downstroke of the lever being utilized to impart motion to the spindle and is accomplished through foot-power.

To the ends of the shaft 7 are secured abrading wheels 27, rotary motion being imparted thereto through a bevel-pinion 28 fast on said shaft, and meshing with a bevel gear-wheel 29 secured to the end of the vertical spindle 9, the gearing being incased in the housing to protect the same against dust or grit.

In place of the two abrading-wheels however, one of the same may be replaced by a fly-wheel if desired, these details being immaterial to my invention, which pertains entirely to the driving-mechanism.

Figure 4:
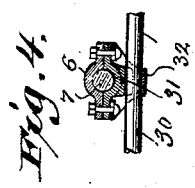

A tool-rest consisting of an adjustable rod 30 is seated in a concave lug 31 depending from one of the split-boxes 6, the rod being held in position by a stirrup 32, which is securely clamped to the split-box by means of its stay-bolts as shown in Fig. 4. A similar tool-rest may be also connected to the opposite box if desired, it being understood that said rest projects beyond the face of the grinder, as seen in Fig. 1.

The foot-lever, as shown in Fig. 1, is at the approximate upper limit of its stroke, and should it be depressed, engagement of the housing and nut will lock the latter against rotation, after which both members will move down together and impart rotation to the spindle. The spindle in turn transmits motion to the abrading-wheels through the bevel-gears. The above described downstroke being completed, the operator relieves the pressure from said foot-lever and permits the same to be returned by the spring to its upper position, the nut, by gravity, immediately becomes disengaged from the housing serrations and on the upstroke of said nut, it will revolve freely with the spindle in the direction of rotation imparted thereto by the downstroke of said lever. Thus the spindle may be rotated continually in one direction, the rotation being sustained through momentum between the down or power-strokes of the foot-lever.

I claim:

1. A driving-gear for a grinding-machine or the like, comprising a frame, a shaft mounted in the frame, a spindle carried by the frame, the spindle being provided with a screw-threaded section, driving-gears connecting said spindle and shaft, a rotatory nut mounted upon the screw-threaded section of the aforesaid spindle, a non-rotatable housing for the nut, a spring-controlled actuating lever for the housing, and locking means in connection with said nut and housing, whereby the aforesaid nut is held against rotation when the lever is actuated in one direction.

2. In a grinding-machine, a vertically disposed frame, a spindle mounted in the frame, the spindle being provided with a screw-threaded section a rotatory nut mounted upon the screw-threaded section, a non-rotatable longitudinally movable housing for the nut, a spring-controlled actuating lever in connection with the housing, a shaft horizontally mounted in the frame, and transmission-gears connecting the shaft and spindle.

3. In a grinding-machine, a bifurcated standard, a tube fitted in the standard, a gear-housing secured to the upper tube end, a spindle revolubly mounted in the tube and bifurcated standard, the spindle being threaded at its lower end, a rotatory nut mounted upon the threaded end of the spindle, a non-rotatable housing for the nut, a foot-lever in connection with the housing, locking means in connection with the housing and nut, a spring in connection with the foot-lever, whereby the same is lifted in opposition to manual-power applied thereto, a horizontally disposed shaft mounted in the gear-housing, and meshed bevel-gears secured to the wheel-shaft and spindle within the gear-housing.

In testimony that I claim the foregoing I have hereunto set my hand at Milwaukee, in the county of Milwaukee and State of Wisconsin in the presence of two witnesses.

JAMES M. THOMPSON.

Witnesses:
GEORGE FELBER,
RALPH NELSON.